No. 847,271. PATENTED MAR. 12, 1907.
H. ATKINSON.
HOOK AND EYE.
APPLICATION FILED SEPT. 26, 1906.
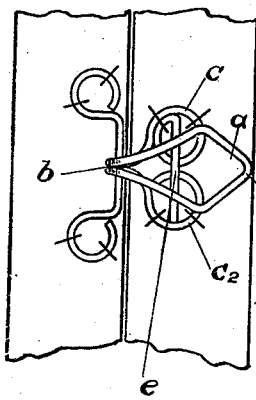
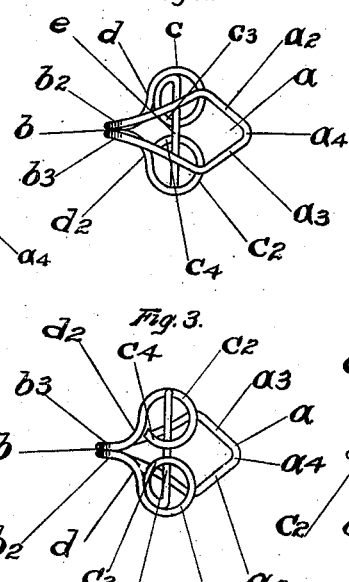
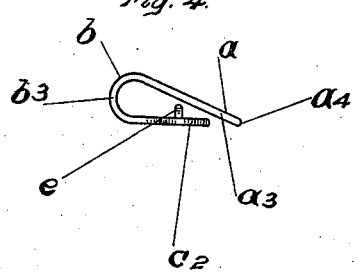
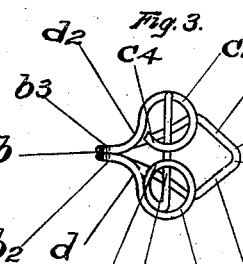
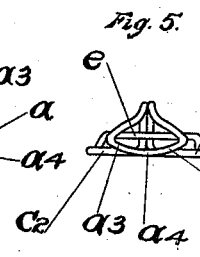
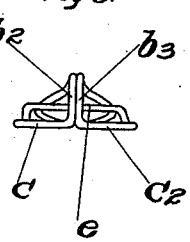
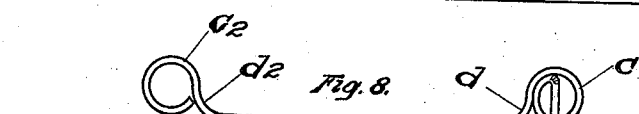
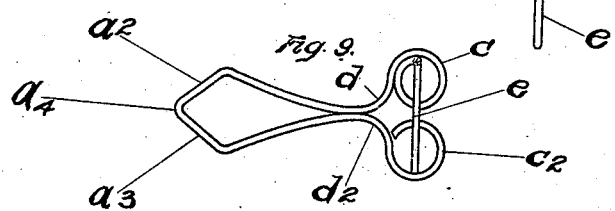
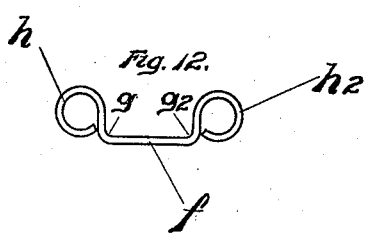
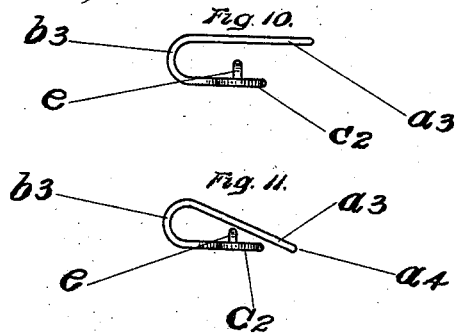
WITNESSES
INVENTOR

UNITED STATES PATENT OFFICE.

HELEN ATKINSON, OF BOSTON, MASSACHUSETTS.

HOOK AND EYE.

No. 847,271. Specification of Letters Patent. Patented March 12, 1907.

Application filed September 26, 1906. Serial No. 336,351.

*To all whom it may concern:*

Be it known that I, HELEN ATKINSON, a citizen of the United States, residing in the city of Boston, in the county of Suffolk and State of Massachusetts, have invented new and useful Improvements in Hooks and Eyes, of which the following is a specification.

My present invention relates to improvements in invisible hooks and eyes, and has as its object, first, to furnish a necessary and specially-designed hook to be used with the invisible eye on ladies' and children's garments and dresses, especially on plackets and soft fronts of dresses; second, to furnish an eye that will meet the requirements of the hook in providing a perfectly neat fastening-in other words, to provide a hook and eye perfectly adapted to each other for the purpose contemplated, my said invention being designed more particularly as an improvement upon the style of hook described in the Letters Patent No. 826,134, granted to me under date of July 17, 1906, to which reference may be had for a more thorough understanding of the general structure to which my present improvements apply.

I provide a hook formed of a single length of wire which is bent into shape so as to form two eyes or loops, a neck, a bill, and a tongue, and an eye so formed as to place the bar beyond the loops by a quarter-bend, all as will be hereinafter fully described, and pointed out in the claims.

In the accompanying drawings, Figure 1 is a plan view of a hook of this invention and of the eye and two pieces of fabric united by them. Fig. 2 is a plan view of the upper side, and Fig. 3 is a similar view of the under side or side which is next to the fabric when the hook is attached. Fig. 4 is a side view. Figs. 5 and 6 are end views. Figs. 7, 8, 9, 10, and 11 show the wire at various stages of its bendings to form the hook of Figs. 2 to 6. Fig. 12 is the eye.

In the drawings, $a$ is the bill.

$b$ is the neck.

$c\ c^2$ are the attaching eyes or loops, and $d\ d^2$ are the quarter-bends.

$e$ is the tongue, and $f$ is the bar of the eye, Fig. 12. $g\ g^2$ are the quarter-bends, by which it is joined to the loops, and $h\ h^2$ are the loops or eyes for sewing to the fabric.

In carrying out my improvements the hook is formed from a short length of wire, (though it may be made of flat metal with the edge forming a convex rim, as is used in hose-supporters, &c.,) which is bent first to form the loops $c\ c^2$, one end being left long enough to form the tongue $e$. The wire is then bent so as to form a triangle in the center and the loops brought together, as fully shown in Fig. 9. Then the wire is doubled or bent near the loops, forming the neck $b$ then brought down to an angle of about forty-five degrees, or until near or quite in contact with the loops and tongue, which is bent upward, as shown in the drawings, so as to prevent accidental escape from the eye. Thus the loops, the tongue, and the bends coöperate with the bill to retain the hook when engaged with the eye against accidental escape therefrom. The eye is also formed from a single length of wire, which is first bent so as to form the loops $h\ h^2$ and then bent to join the bar by a quarter-bend, as shown in Fig. 12. Thus by placing the bar by the quarter-bend beyond the loops—not close to them—the stitches are not visible when fastened.

By having the free end of the bill $a$ project downward in an approximately straight line it receives and retains the eye more readily and can be operated more easily than the construction shown in my patent above mentioned. The broadened triangular shape of the bill also facilitates the hooking of the garment and keeps the hook and the eye in proper united relation to each other. The tongue $e$ coöperates with the straight bill $a$ in locking or retaining the garment against accidental separation. The special shape of the eye and the arrangement of the loop $c\ c^2$ of the hook are such that the holding-stitches keep the parts flat against the fabric and prevent the hook and eye twisting and pulling awkwardly to one side; also, by having the broadened sides of the bill rest approximately over and in contact with the loops $c\ c^2$ it becomes practically impossible for the parts to unfasten accidentally and also they are given great stability of position and are comfortable to the wearer.

Having thus described my invention, what I claim as new and useful is—

1. A hook and eye of the invisible type composed of two parts, the eye part consisting of a bar and end loops joined by a quarter-bend approximately in a plane with the loops, the hook part consisting of the bill $a$, the neck $b$, the loops $c$, $c^2$, and the tongue $e$, the latter being slightly raised, all being formed from a short length of wire, and the bill $a$ being bent in a substantially triangular shape.

2. A hook comprising opposite fastening-loops, and a bill connected with said loops by a relatively large bend and thence projecting forward and downward in two branches separated from each other to pass directly over and substantially in contact with said loops and thence converging together to form an approximately triangularly-pointed bill.

3. A hook, comprising opposite fastening-loops, and a bill connected with said loops by a relatively large bend, the loops being substantially in line with the rear connecting end of the bend, and a bill extending from said bend forwardly and downwardly, and a tongue extending from one loop to the other transversely of said bend and having a raised portion arranged sufficiently close to the bill to retain the hook normally in hooked position, said bill having two branches separated from each other to pass directly over and close to said loops and thence converging together to form a pointed bill.

In testimony whereof I affix my signature in presence of two witnesses.

HELEN ATKINSON.

Witnesses:
M. J. SPALDING,
LOUIS GORDON.